June 26, 1956  L. W. KEIL  2,751,919
SERVO-MOTOR CONTROL VALVE FOR AN AIRPLANE ENGINE
Filed Nov. 17, 1952
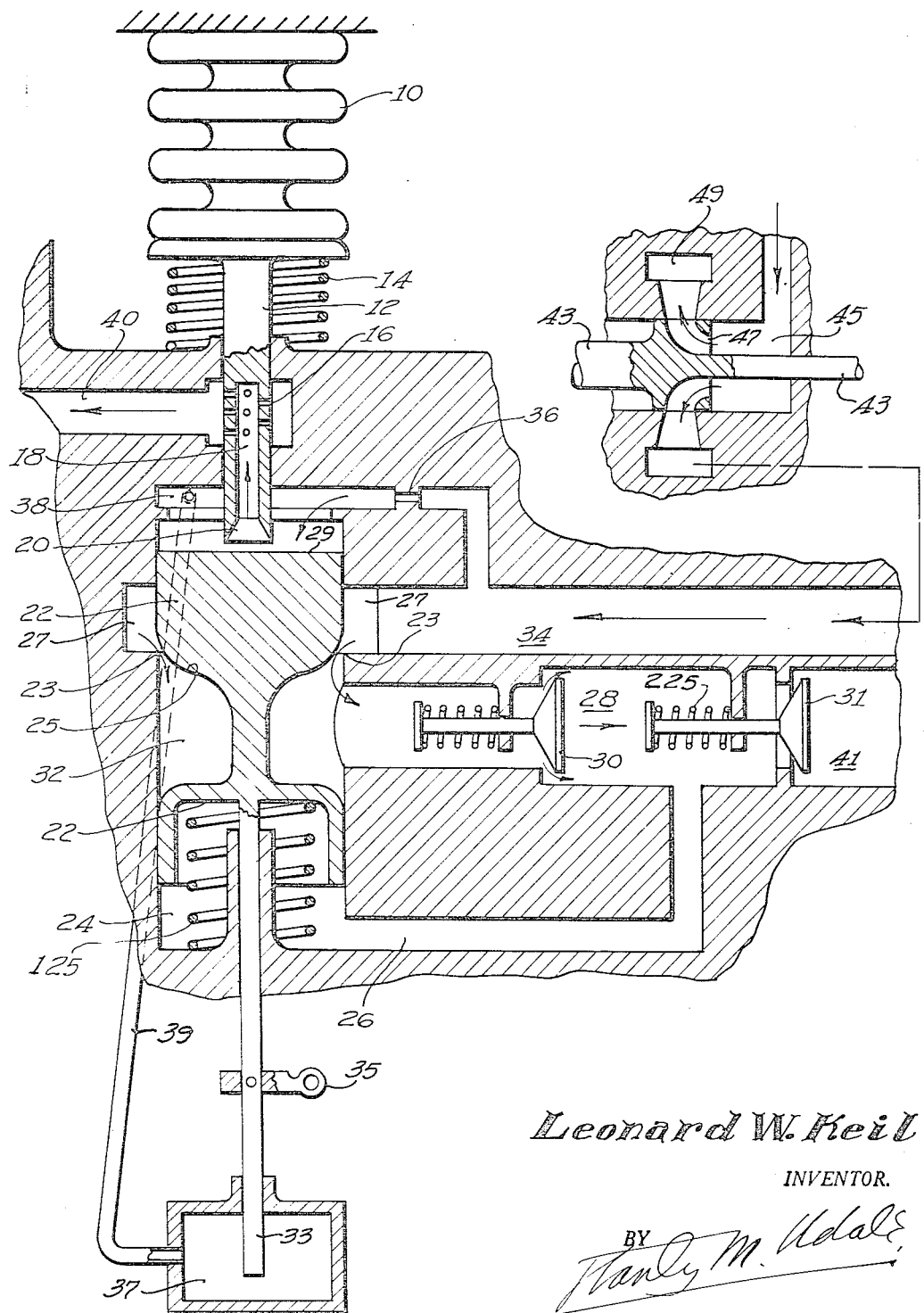
Leonard W. Keil
INVENTOR.
BY
ATTORNEY

United States Patent Office 2,751,919
Patented June 26, 1956

2,751,919
SERVO-MOTOR CONTROL VALVE FOR AN AIRPLANE ENGINE

Leonard W. Keil, Wayne, Mich., assignor to Holley Carburetor Company, Detroit, Mich., a corporation of Michigan Application November 17, 1952, Serial No. 320,982

1 Claim. (Cl. 137—81)

The object of this invention relates to a fuel flow control for a prime mover for an airplane. In prime movers the fuel flow usually determines speed and load except in those which operate on the Otto-Carnot cycles. For example, both the gas turbine and diesel cycles give an increase in speed with each fuel flow increase and the increase is almost exactly proportional. Hence, some sensing means for example, an aneroid capsule responding to atmospheric pressure may well constitute the major controlling element as more fuel will be needed at low altitudes. To translate the comparatively feeble force exerted by an aneroid into a powerful force of considerable magnitude is the object of this invention.

A small hollow cup servo-valve connected to a capsule (aneroid) constitutes an escape passage for the pressure at one end of a cylinder in which a controlled slave-piston valve moves, the other end of the cylinder being subjected to a higher pressure so that the controlled slave piston valve is moved by a pressure differential brought into action by the capsule acting through the small hollow cup servo-valve. The piston slave valve may, itself, throttle the fuel flow or it may operate mechanisms that will throttle the fuel flow.

In the figure:

10 is the capsule of thin metal which, in this case, responds to atmospheric pressure.

12 is a hollow cup servo-valve pushed down by the capsule 10 and returned by a compression spring 14.

16 are escape openings in the passage 18 in the center of the hollow servo-valve 12.

20 is the conical mouth of passage 18, making the hollow valve 12 a cup valve.

40 is a low presure escape outlet.

38 is a pressure chamber of the cylinder 38—24 connected through the passage 18 with escape outlet 40 and connected through restriction 36 with a high pressure entrance 34 so that the pressure in 38 is between the low pressure in 40 and the high pressure in 34. 22 is the slave piston whose motion is controlled by the hollow cup servo-valve 20—18—16 and capsule 10. The conical mouth of the valve 16—18—20 always approaches, but never quite touches, the top flat surface 29 of slave valve 22 during normal operation. An annular port 27 in the cylinder 32 has a sharp corner forming a variable restriction 23. A contoured surface 25 on the waist of the piston valve 22 constitutes the variable restriction with the sharp corner 23 in the fuel passage 34—32—28—41 which acts so as to control fuel flow from high pressure entrance 34 to chamber 32 and so to the fuel outlet 28 and 41. From chamber 32 around the waist of valve 22 fuel flows past non-return valve 30 to passage 28. From passage 28 fuel flows past non-return valve 31 (loaded by spring 225) to outlet passage 41 to the prime mover. Passage 26 connects passage 28 upstream of valve 31 with the cylindrical chamber 24 below the piston valve 22. A spring 125 may be used to urge the piston valve 22 upwardly.

Where a power take off rod 33 is required in addition to or as a substitute for the fuel restriction between surface 25 and the edge 23 of annular port 27, a chamber 37 is provided into which the rod 33 enters. A pressure equalizing passage 39 connects chamber 37 with chamber 38, the upper end of the cylinder in which piston valve 22 reciprocates. A lever 35 provides the means for operating the fuel control mechanism not shown. By substitute is meant that the restriction to flow between the curved surface 25 and the sharp corner 23 can alternatively be accomplished by the lever 35.

A centrifugal pump 47 driven by and integral with shaft 43 is driven by the prime mover not shown. The annular chamber 49 constitutes a source of pressure and 45 constitutes the low pressure entrance chamber. The fuel entrance passage 34 is connected with the annular exit chamber 49 of centrifugal pump 43—45—47.

Operation

Assume that the plane descends and that the barometric pressure increases—capsule 10, which may be more or less evacuated, then moves the cup valve 20 up and the clearance 29 of the top face 29 of the piston valve 22 and the open mouth of the valve 20 increases. The pressure in chamber 38 falls and the piston valve 22 is thus moved up by pressure in chamber 24. Equilibrium is restored as the slave valve 22 rises and follows the movements of cup shaped servo-valve 20. If pressure in 49 and 34 is 800 p. s. i., in 32 it will be 500 to 650 p. s. i.; in 28 it will be 150 to 500 p. s. i.; in 41 it will be 20 p. s. i. constant, and in 40 it will be 15 lbs. per square inch.

Valve 22 has a waist contour 25 which never completely shuts off before valve 22 hits the lower stop. Shutoff or complete closure of valve 22 is not necessary and would be extremely difficult, since valve 22 is necessarily a floating piston with a reasonable close clearance. This leakage will always provide pressure (150 to 500 p. s. i.) in passage 28, which will provide the upward pressure differential to return it to normal operation. Shutoff or stopping flow through passages 34, 28 and 41 is accomplished by stopping rotation of shaft 43 of pump.

Spring 125 is used for stability purposes, i. e., changing the rate of the system. It is not absolutely required for normal operation.

The rod 33 is enclosed in chamber 37 to balance out the varying pressures in chamber 38 and to provide an outer support for rod 33. The system would work without this balancing chamber since the clearance between valve 20 and valve 22 would adjust automatically to compensate for the unbalance introduced by the elimination of balance chamber 37. However, it is desirable to balance the system in order to avoid overtaxing the servo valve 12.

Before the pump 43, 49 begins to rotate the valve 22 is pushed up by the spring 125 and completely closes the mouth 20 of the servo valve 12.

Immediately this pump begins to rotate high pressures are generated (700/800 p. s. i.) and are admitted through 36 (a restriction) and through the clearance between the valve 22 and the cylinder, in which it slides, to the chamber 38. This pressure in chamber 38 overcomes the spring 125, the valve 22 moves down and this motion downwards of 22 simultaneously lowers the pressure in chamber 38 by opening the mouth 20 of valve 12 and raises the pressure in chamber 24 by the flow past the valves 22 and 30 which changes check the motion and the valve 22 assumes a position such as the one shown.

This application is a continuation in part of my now abandoned co-pending application, Serial No. 241,235, filed August 10, 1951, for "Servo-Motor and Control Valve."

What I claim is:

In a fluid flow controlling device, responsive to capsule movement, a housing having a hydraulic servo-valve and an associated piston slave-valve, an operating capsule connected to said servo-valve, an inlet in said housing for said slave-valve, said servo-valve being cup-shaped and provided with an aperture in its wall, said piston slave-valve having a flat end face at right angles to the axis of the slave valve and cooperating with the mouth of said cup shaped servo-valve for controlling the flow of liquid therethrough, a cylinder in said housing in which the slave piston valve reciprocates, an opening in the end of said cylinder providing a cylindrical shaped escape orifice from the end of said cylinder adjacent said flat face through said servo-valve, a restricted passage leading to the end of said cylinder in which the cup shaped servo-valve is slidably mounted, means for admitting pressure liquid from said inlet to the restriction and so to said end of said cylinder, a low pressure escape outlet for said cup shaped servo-valve, means for regulating the flow of liquid under pressure comprising an annular port in said cylinder in communication with said inlet, a reduced waist portion on said piston valve adapted to form with the inner edge of said port, a variable restriction, a main outlet downstream from the cylinder downstream of said variable restriction, a second variable restriction in the outlet downstream of said first variable restriction, a third variable restriction in the outlet downstream of said second restriction, a passage leading from the main outlet at a point between the two latter restrictions to the other end of said cylinder.

References Cited in the file of this patent
UNITED STATES PATENTS

| | | |
|---|---|---|
| 1,284,227 | Bouvier | Nov. 12, 1918 |
| 1,346,563 | Sherbondy | July 13, 1920 |
| 2,419,707 | Cooper | Apr. 29, 1947 |
| 2,575,366 | Sollmann | Nov. 20, 1951 |